United States Patent
Mattela et al.

(10) Patent No.: US 6,226,707 B1
(45) Date of Patent: *May 1, 2001

(54) SYSTEM AND METHOD FOR ARRANGING, ACCESSING AND DISTRIBUTING DATA TO ACHIEVE ZERO CYCLE PENALTY FOR ACCESS CROSSING A CACHE LINE

(75) Inventors: Venkat Mattela; Muhammad Afsar, both of San Jose, CA (US)

(73) Assignee: Siemens Aktiengesellschaft, Munich (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,054

(22) Filed: Nov. 17, 1997

(51) Int. Cl.[7] .............................. G06F 12/06; G06F 13/00
(52) U.S. Cl. .................. 711/3; 711/5; 711/157; 711/201
(58) Field of Search .................... 711/201, 3, 5, 711/157, 119, 120, 129; 365/230.03, 230.04

(56) References Cited

U.S. PATENT DOCUMENTS

| | | | |
|---|---|---|---|
| 5,414,824 | * 5/1995 | Grochowski | 711/3 |
| 5,446,850 | 8/1995 | Jeremiah et al. | 712/215 |
| 5,557,768 | 9/1996 | Braceras et al. | 711/131 |
| 5,559,986 | * 9/1996 | Alpert et al. | 711/157 |
| 5,572,700 | 11/1996 | Hays et al. | 711/139 |
| 5,574,880 | * 11/1996 | Shaw | 365/230.03 |
| 5,640,526 | 6/1997 | Mahin et al. | 712/207 |
| 5,701,430 | * 12/1997 | Jeremiah et al. | 711/118 |
| 5,854,761 | * 12/1998 | Patel et al. | 365/49 |
| 5,854,914 | * 12/1998 | Bodas et al. | 712/216 |

FOREIGN PATENT DOCUMENTS

| | | |
|---|---|---|
| 0 055 579 | 12/1981 | (EP). |
| 0 365 281 | 10/1989 | (EP). |
| 0 803 818 | 4/1997 | (EP). |

OTHER PUBLICATIONS

Ngai, A. Y. and C.H., "Boundary Crossing within a Cache Line", IBM Technical Disclosure Bulletin, vol. 25, No. 7A, Dec. 1982, pp. 3539–3542.

Yim, Joon–Seo et al., "SEWD: A Cache Architecture to Speed up the Misaligned Instruction Prefetch", IEICE Transactions on Information and Systems, vol. E80 No. 7, Jul. 1997, pp. 742–745.

* cited by examiner

Primary Examiner—Glenn Gossage

(57) ABSTRACT

A data processing system and method for arranging and accessing information that crosses cache lines utilize dual cache columns. The dual cache columns are formed of two access-related cache lines. The two cache columns contain sequential information that is stored in cache lines in a sequential and alternating format. A processor makes a request for a particular instruction. An instruction fetch unit takes the instruction request and creates a second instruction request in addition to the first instruction request. The two instruction requests are sent simultaneously to first and second content addressable memories (CAMs) respectively associated with the first and second cache columns. The CAMs are simultaneously searched and any cache hits are forwarded to a switch. The switch combines the relevant portions of the two cache lines and delivers the desired instruction to a processor. A method of accessing and distributing stored data in a computer system is also described. The method includes generating the data to be distributed by combining relevant segments from simultaneously accessed first and second cache lines.

19 Claims, 5 Drawing Sheets

SYSTEM AND METHOD FOR ARRANGING, ACCESSING AND DISTRIBUTING DATA TO ACHIEVE ZERO CYCLE PENALTY FOR ACCESS CROSSING A CACHE LINE

BACKGROUND OF THE INVENTION

The present invention relates to a method and system for data processing that utilizes cache memory, and more particularly to a method and system that utilizes dual access to cache memory.

DESCRIPTION OF THE RELATED ART

Cache memory is a special high speed memory designed to supply a processor with the anticipated most frequently requested instructions and data. Instructions and data located in cache memory can be accessed many times faster than instructions and data located in main memory. The more instructions and data the processor can access directly from cache memory, the faster a computer will operate.

In general, there are two levels of cache memory, internal cache, which is typically located inside the processor chip, and external cache, which is normally located on the system board. Internal cache is sometimes referred to as primary cache or level one (L1) cache. External cache is sometimes referred to as secondary cache or level two (L2) cache., In most desktop personal computers, the internal cache will range from 1 kilobyte(KB) 32 KB (1,000 to 32,000 bytes) in size. In contrast, external cache configurations are usually much larger, ranging in size from 64 KB to 1 megabyte (MB) (64,000 to 1,000,000 bytes). Cache memory is usually arranged in a series of cache lines. Each cache line has a fixed capacity. For example, a typical cache line has a capacity to store 32 bytes. A cache memory of 32 KB would consist of one thousand 32-byte cache lines.

FIG. 1 is a depiction of a known configuration of a computer system 10 that utilizes cache memory. The cache memory 14 is usually placed operationally between the data processor 18 and the main memory 12. When the processor requires access to specific information, a request is transmitted to the fetch unit 19. The fetch unit looks first to the cache memory to determine whether the information required is available in the cache.

Data and/or instructions are stored in the cache based on what data and/or instructions are likely to be needed next by the processor. The fetch unit looks first to cache memory because if the requested data is located in the cache memory, access time is greatly reduced relative to the time necessary to access the main memory. If the data is not present in the cache, the main memory is accessed to obtain the desired data. In addition to obtaining the data from the main memory for execution, the desired data and data surrounding the desired data are copied from the main memory and stored in the cache. Data surrounding the desired data is stored in the cache because there is a statistical likelihood that the surrounding data will be needed next by the processor for execution. If the surrounding data is subsequently needed, it will be available for fast access in the cache memory.

Again referring to FIG. 1, once data is accessed from the cache, the data is transferred to a switch 16. At the switch, the data is delivered to the processor. Typical processors are able to process 16, 32, or 64 bits of information per clock cycle.

Information stored in the cache is usually packaged in groups of bytes that are integer multiples of the processor bandwidth and the cache line capacity. However, some processors allow variable length information packages to be processed. In the case of variable length information packages, the information, either data or instructions, may not be an integer multiple of the cache line capacity. As a result, one instruction that is comprised of multiple bytes may begin on one cache line and end on the next sequential cache line. This is referred to as data that crosses a cache line.

In a typical architecture, only one cache line can be accessed per clock cycle. If one instruction crosses a cache line, then the processor must access the cache two times to obtain both cache lines. Consequently, the processor requires two clock cycles to access the complete instruction which is located on two distinct cache lines. The additional clock cycle slows the overall operation of the computer system.

What is needed is a system and method for accessing instructions that cross a cache line without requiring an extra clock cycle.

SUMMARY OF THE INVENTION

The present invention allows for accessing information that crosses cache lines without requiring an additional clock cycle. The invention involves splitting a cache memory into two cache memories. Each cache memory is comprised of a column of cache lines. Each cache column has an associated content addressable memory (CAM).

Information in the form of instructions and/or data is stored in the cache columns from a main memory in a sequential and alternating format. The two cache columns in the cache memory are designated as an even cache column and an odd cache column.

A typical cache column is made up of cache lines that have the capacity to store 32 bytes of information per line. In the preferred embodiment of the invention, information is stored in 32-byte increments in sequential alternating cache lines. That is, a first block of 32 bytes of data is stored in an even cache line and the next sequential block of 32 bytes of data is stored in a next sequential odd cache line. An address associated with both cache lines of information is stored in respective CAMs.

To initiate cache access, the fetch unit within the processor of a computer system makes an information request. The information may be computer instructions or database information. For purposes of the disclosure, the information is referred to as "instructions." The program computer (PC) block of the fetch unit generates an instruction request using a predefined 32-bit address format that includes a line index number or tag.

In parallel with the generation of the initial instruction request, the fetch unit creates a second instruction request. The second instruction request is created by advancing the initial instruction request to the next sequential instruction address. The address advancement involves toggling an indicator bit or adding one address unit to the initial instruction tag. The second instruction request is also directed to the column opposite the column that the initial instruction request identified. Therefore, if the initial instruction request identifies a cache line in the even cache column, then the second instruction request will identify the next sequential cache line in the odd cache column.

Once the fetch unit has established two instruction requests, the fetch unit simultaneously accesses the CAMs of the even and odd cache columns according to the two instruction requests. If a cache hit is found in either cache column, the appropriate cache lines are delivered in parallel to a switch.

The switch receives the two cache lines containing the requested instructions and determines from the cache line address whether or not the requested instruction crosses a cache line. If the requested instruction is in the last double-word of the cache line, the requested instruction crosses the cache line and the switch identifies the requested instruction segments in both cache lines combining the segments into the desired instruction. Once the desired instruction has been combined from the two cache lines, the switch delivers the desired instruction to the processor.

By dividing cached information into two cache columns, two cache lines can be accessed simultaneously. As a result, instructions and/or data that cross cache lines can be accessed without requiring extra computer clock cycles. Because more data can be accessed in fewer clock cycles, the overall performance of the computer is enhanced.

DETAILED DESCRIPTION

Figure 2:
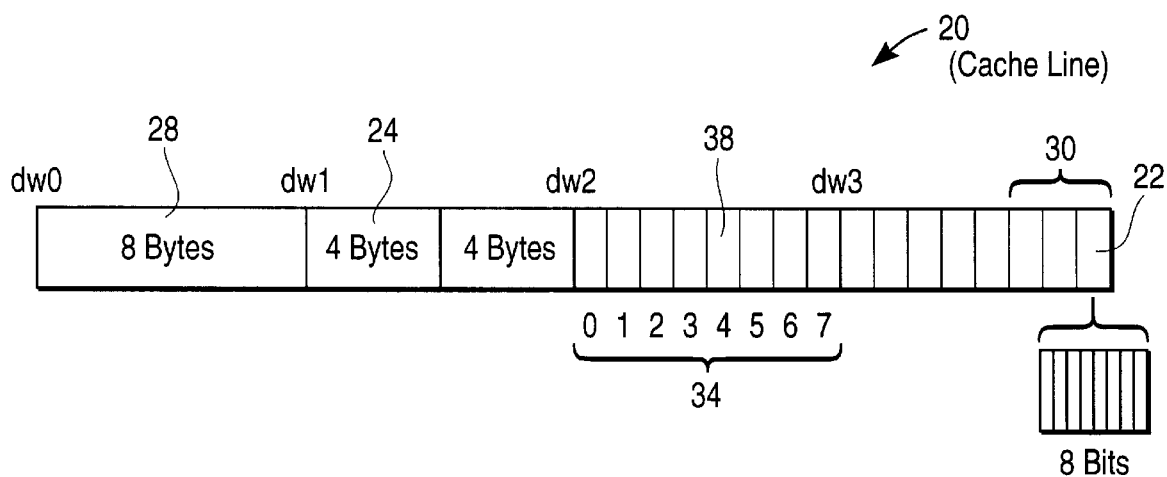
FIG. 2 is a depiction of a 32-byte cache line.

FIG. 2 is a 32-byte cache line 20 that is presented in order to define relevant terms that are used in the following description of the invention. One byte 22 has 8 bits and the 32-byte cache line has a total of 256 bits. Words and bytes are used to refer to a certain part of data in a cache line. A word 24 is made up of 4 bytes, a double-word 28 is made up of 8 bytes, and a half-word 30 is made up of 2 bytes. From left to right in FIG. 2, the first double-word is designated as double-word zero (dw0). The next double-words from left to right are dw1, dw2, and dw3, respectively. Within each double-word there are 8 bytes 34 identified from left to right as byte 0 through byte 7. To refer to a particular byte on a cache line, the double-word is referred to and the byte within the double-word is identified. For example, dw2, byte 4 is depicted by element 38.

Data stored in the cache lines is identified by a unique line index number, also known as a tag. The tag allows the processor to find desired data that is stored on a particular cache line in the cache memory. When the processor requests a specific instruction, the processor provides the tag for the particular cache line and the location of the data in the cache line using the double-word and byte number designation described above.

Figure 3:
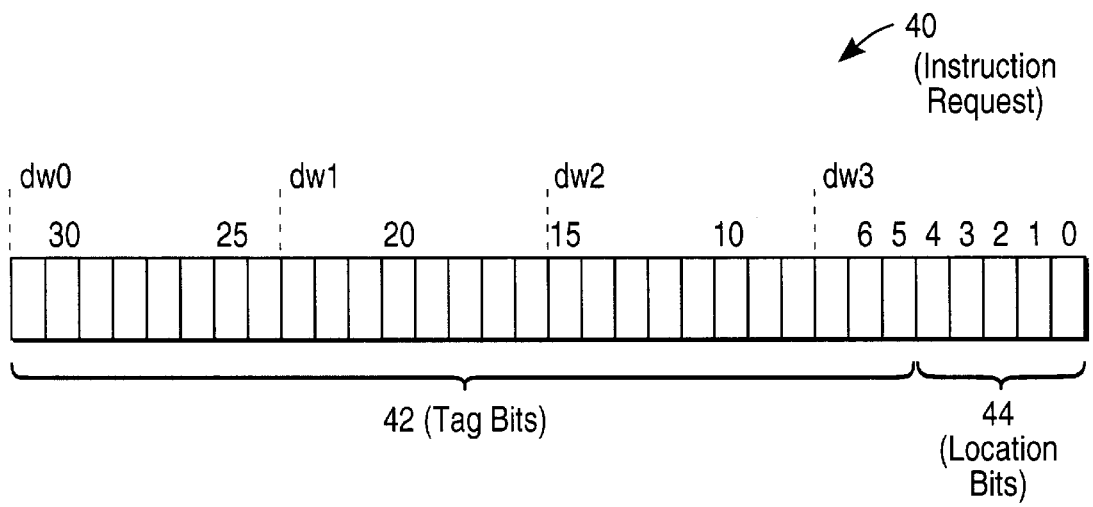
FIG. 3 is a depiction of a 32-bit binary instruction line.

FIG. 3 depicts a 32-bit binary instruction request 40 that includes the tag and instruction location. The bits are numbered from right to left starting with bit 0 and ending with bit 31. Bits 31 to 5 are the tag bits 42. The tag bits identify the particular cache line that is requested. Bits 4 to 0 are the instruction location bits 44. Bits 4 and 3 of the instruction location bits identify, in binary format, the double-word index of an instruction. As stated above, in a 32-byte line, the four double-words range from dw0 to dw3. Bits 2, 1, and 0 identify, in binary format, the byte number index in a particular double-word. A complete 32-bit instruction request identifies a cache line, a double-word, and a byte number within the identified double-word.

Figure 4:
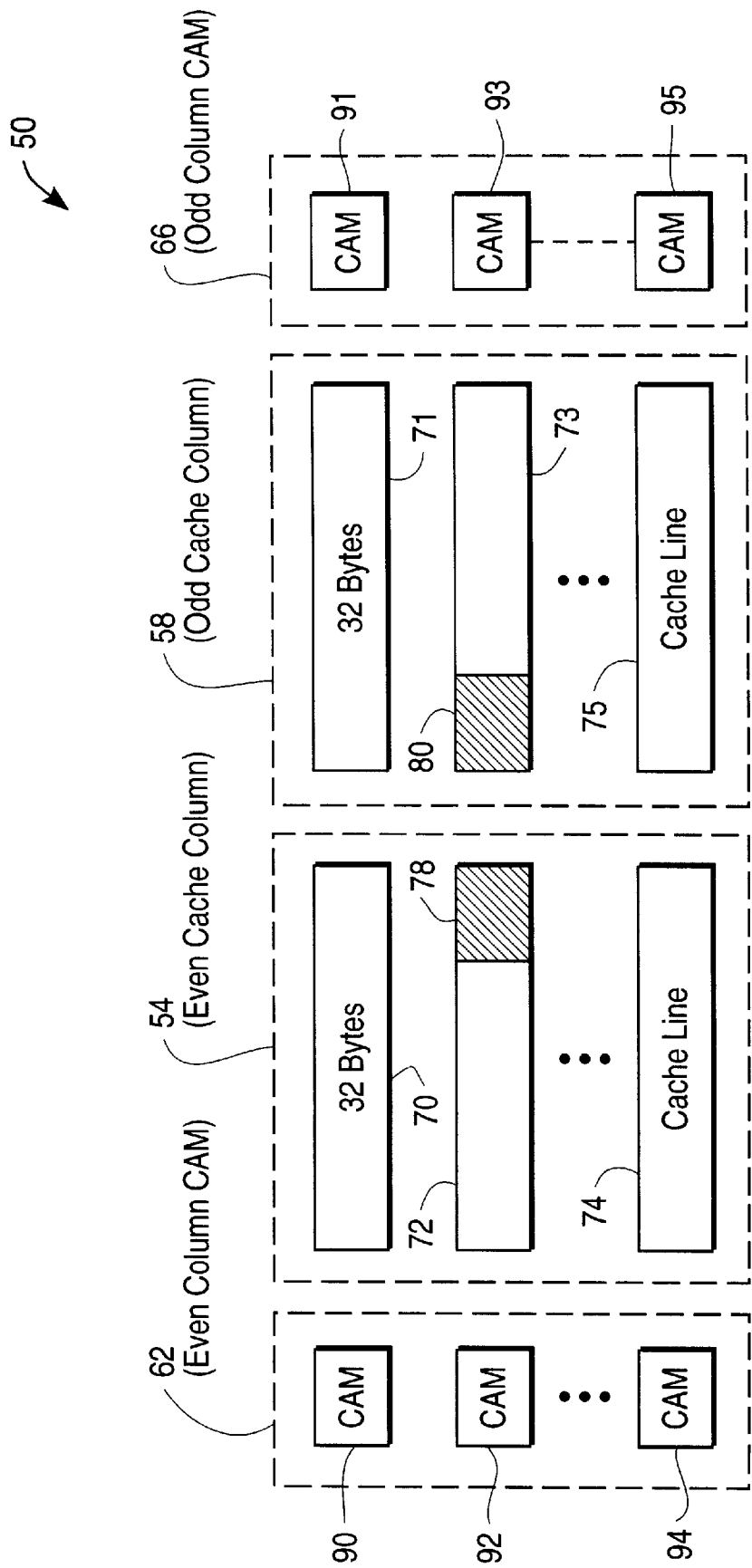
FIG. 4 is a depiction of dual cache lines and associated content addressable memory in accordance with the present invention.

A conventional cache memory is comprised of a single column of cache lines and an associated content addressable memory. In comparison, FIG. 4 is a depiction of the preferred cache arrangement 50 in accordance with the invention. The cache has been divided into two cache columns 54, 58 of multiple cache lines. Each cache column has an associated content addressable memory (CAM) 62 and 66.

The cache lines 70, 71, 72, 73, 74 and 75 are 32 bytes in capacity. The left cache column 54 is identified as the even cache column, and the right cache column 58 is identified as the odd cache column. In the preferred embodiment, the tag address of each cache line, consists of a line index number and an even/odd indicator. The line index number is a sequential number that indicates a particular cache line. The line index number is made up of bits 31 through 6. The even/odd indicator identifies if the cache line belongs in the even cache column or the odd cache column. The even/odd indicator is located at bit 5. If bit 5 is a "0," then the cache line belongs in the even cache column. If bit 5 is a "1," then the cache line belongs in the odd cache column. The even/odd bit can be "flipped" or toggled to change the indicator from 0 to 1 or an adder can be used to change the indicator from 1 to 0, thereby changing the designation of the column in which the cache line belongs. The combination of the line index number and the even/odd indicator constitutes the tag.

When data is stored in the cache, it is stored in a sequential alternating fashion. For example, the first 32 bytes of data are stored in a first even-numbered cache line 70 and the next 32 bytes of data are stored in the next sequential odd-numbered cache line 71. If a sequence of data to be stored in the cache is greater than the 32 bytes available in one cache line, the sequence of data is stored 32 bytes at a time in sequential cache lines.

In a processing system that allows variable length instructions, one sequential instruction may cross cache lines. Since the cache lines are split up into alternating even and odd lines, some of the sequential instruction will be on an even line and some of the sequential instruction will be on an odd line. As depicted in FIG. 4, a first part of a sequential instruction 78 may be stored on a first even cache line 72 and a second part of a sequential instruction 80 may be stored on a second odd cache line 73.

The CAM 90, 91, 92, 93, 94 and 95 associated with each cache line contains data indicative of the tag for each cache line. The CAM is associative memory that is accessed not by an explicit index, but by the data it contains. When a processor requests a particular instruction needed for execution, the CAM is rapidly searched by tag number. If the CAM contains the tag for the particular instruction, then there is a cache hit and the cache line is delivered to the processor.

Figure 1:
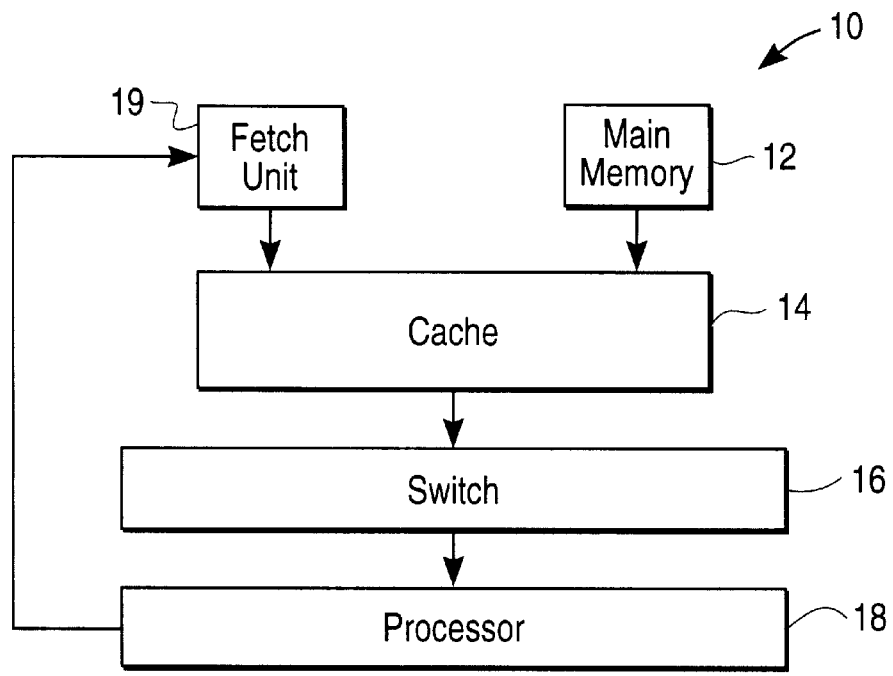
FIG. 1 is a depiction of a prior art computer system with cache memory.
Figure 5:
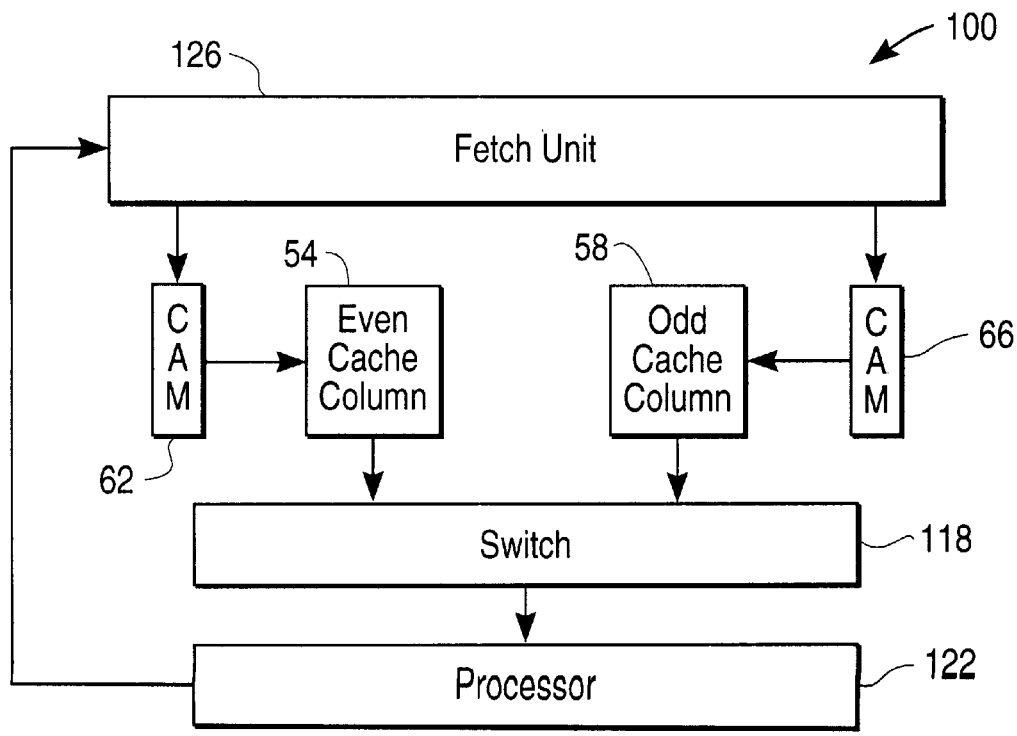
FIG. 5 is a depiction of a computer system with dual cache lines in accordance with the present invention.

FIG. 5 is a depiction of the preferred embodiment of the cache access system 100 of the present invention. The preferred embodiment incorporates the cache arrangement described with reference to FIG. 4. As described above, the cache line columns are identified as even and odd. The left cache column 54 is the even cache column and the right cache column 58 is the odd cache column. Both cache columns contain multiple cache lines, and both cache columns have associated CAMs 62 and 66. The cache memory in the preferred embodiment is integrated onto the processor chip. In other embodiments, the cache memory may be external to the processor chip.

The system also has a switch 118. The switch receives the data that is supplied from the cache lines and manipulates the data into the proper instruction size for the processor 122. If the processor fetch band-width is 64 bits, then the switch attempts to keep the processor supplied with 64 bits (or 8 bytes) of data at each clock cycle.

The processor 122 may be any conventional processor. The processor may have a bandwidth of 16, 32, or 64 bits of data. As technology advances, processors may be designed that process more data, but the present invention is still applicable. Although not shown, the processor is connected to the main memory where the processor has access to any data that is not found in the cache memory.

The fetch unit 126 is responsible for ensuring that the processor is adequately supplied with instructions and/or data. Although shown as a separate unit in FIG. 5 for discussion purposes, the fetch unit is integrated onto the processor chip. In alternate embodiments, the fetch unit may be external to the processor chip.

The operation of the preferred embodiment is described with reference to FIGS. 4 and 5. To begin the operation, data blocks from a main memory are stored in the cache columns 54 and 58. As described with reference to FIG. 4, sequential data from the main memory is stored sequentially in alternating cache lines of the cache memory. For example, a first block of 32 bytes of data is stored in a first even cache line 72 and then the next sequential block of 32 bytes of data is stored in the next sequential odd cache line 73. A tag address associated with both cache lines of data is stored in CAMs 92 and 93, respectively. In an alternate embodiment, the blocks of data can also be stored first in the odd cache column and then in the even cache column.

To initiate the cache access process, the processor makes an instruction request. The fetch unit 126 generates, in parallel, two instruction requests that resemble the format described with reference to FIG. 3. The two instruction requests include a tag, a double-word index, and a byte number index. For example purposes, assume that the instruction requests are for a set of cache data that cross a cache line such as the information identified as elements 78 and 80 in FIG. 4.

The first instruction request is for the instruction that resides on the even cache line 72 and the second instruction request is for the instruction that resides on the next sequential odd cache line 73. Since the first cache line request is for an even cache line, the even/odd indicator, bit 5, of the cache line index number is a "0." The second request is generated by advancing the line index number to the next sequential number. Advancing the line index number to the next sequential number is accomplished by toggling the even/odd indicator from "0" to "1," which advances the binary line index number by one, thereby creating two fetch addresses that represent sequential cache lines.

If toggling is used as the only way to advance the cache line index number, then when the first cache line request is for an odd cache line, a cycle penalty is taken. A cycle penalty is taken because toggling the even/odd indicator from a "1" to a "0" will not advance the cache line index to the next cache line index but will instead reduce the binary index number by 1.

In an alternate embodiment of the invention, to eliminate the cycle penalty because of an initial odd cache line request, an adder can be used to advance the initial line index number to the next sequential line index number. An adder allows the initial odd cache line index to be properly advanced by adding 1 to the initial odd cache line index number and carrying the binary addition. In algorithm form, this would translate into a formula of the line index number plus 1 or (n+1). Advancing the line index number from an odd number to an even number will change the even/odd indicator to a 0, representing the even cache column.

Once the fetch unit has established two tag addresses, the even and odd tag addresses are sent in parallel to the respective CAMs 62 and 66. The tag addresses are simultaneously compared to the respective CAMs for cache hits. In the ideal operation, a cache hit is found in each sequential cache column, one cache line 72 being from the even column and the next cache line being the next sequential cache line 73 in the odd column.

Assuming that the desired instruction that crosses a cache line is located in sequential even and odd cache lines, the two cache lines will be simultaneously accessed and delivered to the switch. The switch receives the two cache lines 72 and 73, each containing 32 bytes of data. The two parts 78 and 80 of the desired instruction are partially located in the even cache line 72 and the odd cache line 73. The switch identifies the desired parts of the cache lines and combines the parts 78 and 80 into the desired instruction. Once the desired instruction has been combined, the switch delivers the instruction to the processor utilizing the entire processor bandwidth. By accessing the two cache columns in parallel, no clock cycle penalty occurs for an access that crosses a cache line.

Figure 6:
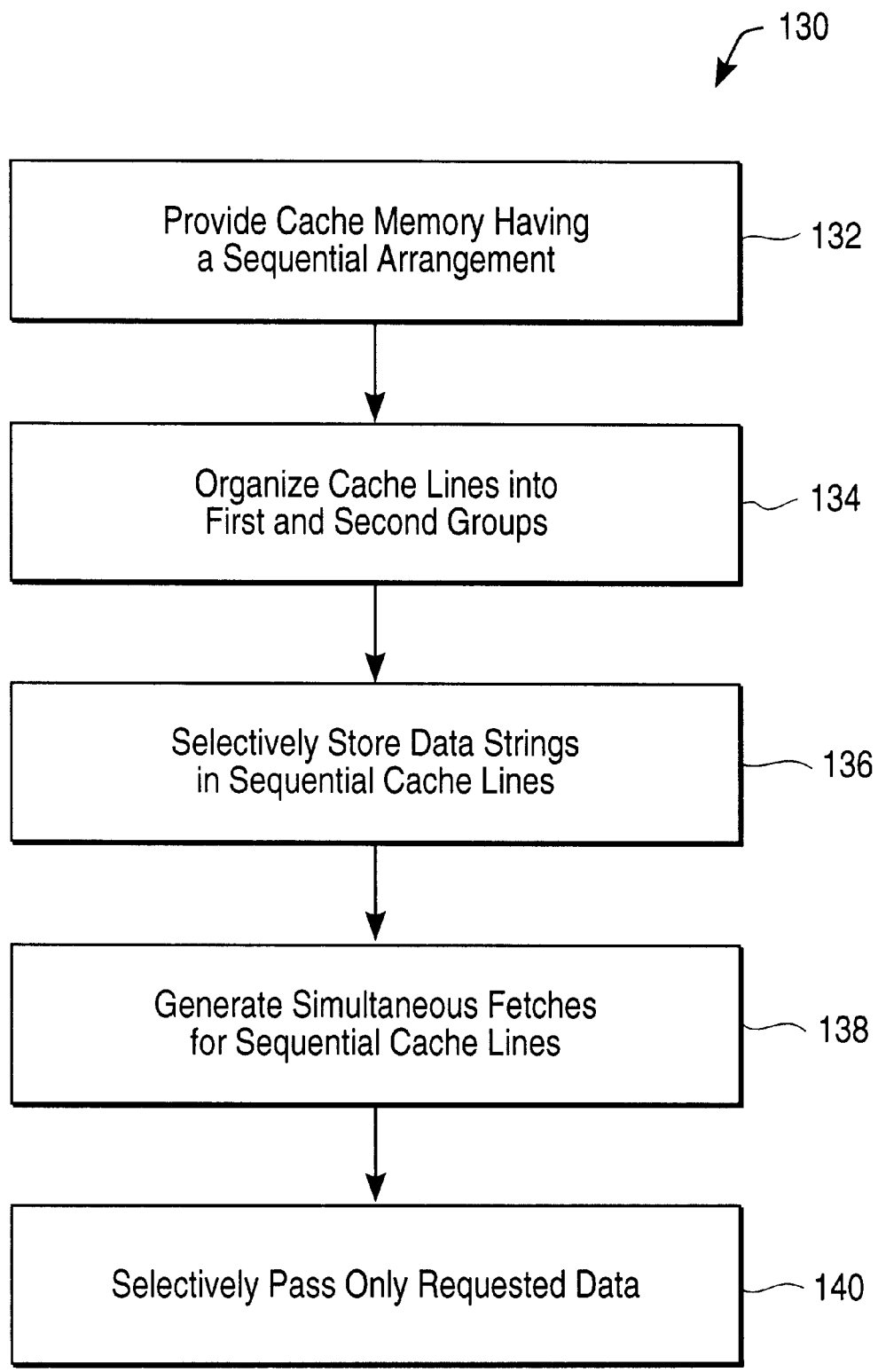
FIG. 6 is a depiction of a method for arranging and accessing cached data in a computer system in accordance with the present invention.

In addition to the system described above, a method is disclosed for arranging and accessing cache data in a computer system. Referring to FIG. 6, the first step in the method 130 is a step 132 of providing cache memory having a sequential arrangement of cache lines where each cache line has a line-storage capacity. Next is a step 134 of organizing the sequential arrangement of cache lines into first and second groups of cache lines. The cache lines are organized such that the cache lines are placed in the two groups in an alternating fashion. Next is a step 136 of selectively storing data strings in the groups of sequential cache lines. In this step, a string of data is stored in a first cache line until the cache is full and then the remaining portion of the string of data is stored in the next sequential cache line. Next is a step 138 of generating simultaneous fetches for sequential cache lines of data. The last step 140 is selectively passing only the requested data string.

Figure 7:
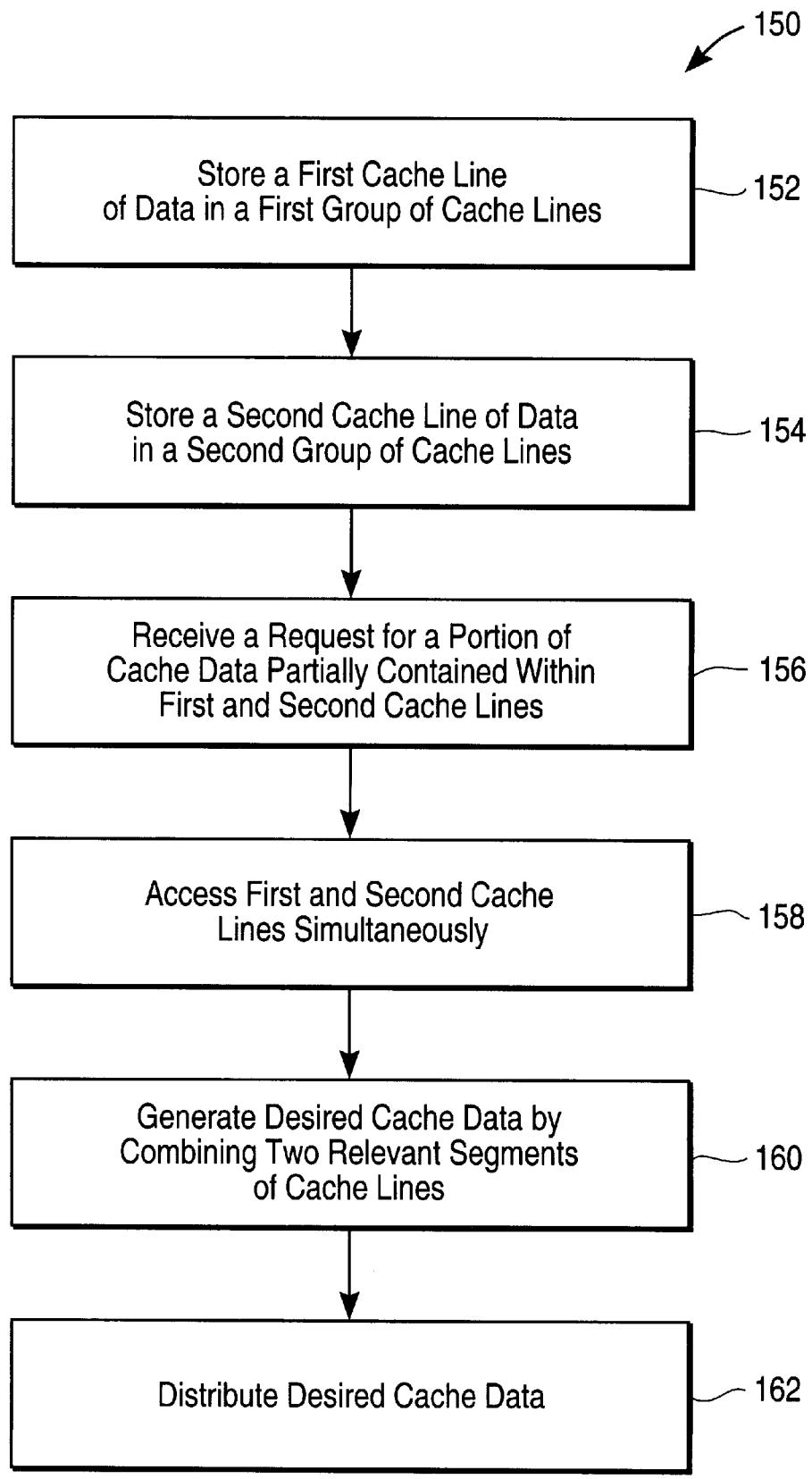
FIG. 7 is a depiction of a method for accessing and distributing stored data in a computer system in accordance with the present invention.

In addition to the above method, a method of accessing and distributing stored data in a computer system is disclosed. Referring to FIG. 7, the first step in the method 150 is a step 152 of storing a first cache line of data in a first group of cache lines. The first cache line has a first tag address. Next is a step 154 of storing a second cache line of data in a second group of cache lines. The second cache line has a second tag address. The second cache address is the next sequential cache address to the first tag address. In the step, the first and second groups of cache lines are distinct from each other. The next step 156 is a step of receiving a request for a desired portion of cache data where the cache data is partially contained within the first and second cache lines. Next is a step 158 of accessing the first cache line of data and the second cache line of data simultaneously. Next is a step of generating 160 the desired portion of cache data by combining relevant segments of the first cache line of data and the second cache line of data. The last step is a step 162 of distributing the desired portion of cache data for further processing in a computer system (e.g., delivering instruction data or database information to the processor of a computer in which the method 150 is executed).

What is claimed is:

1. A method of arranging and accessing cached data in a computer system comprising steps of:
   providing first and second independently managed cache memories, each said cache memory having an arrangement of cache lines having a line-storage capacity;
   organizing said cache lines into first and second groups, including assigning an ascending numerical sequence to said cache lines of said first and second cache memories in an alternating fashion;
   selectively storing data strings in said cache lines, including storing a portion of a multi-line data string in a sequentially next cache line when said line-storage capacity is exceeded during the storage of said multi-line data string in a sequentially previous cache line;
   generating simultaneous fetch requests for sequential cache lines of said first and second groups in response to each data string request; and
   selectively passing data acquired in response to said simultaneous fetch requestss, including passing only the requested data string.

2. The method of claim 1 wherein said step of selectively storing data strings in said cache lines includes a step of assigning tag addresses to data strings that are stored in said cache lines, said tag addresses indicating a location of corresponding data strings within said cache memory.

3. The method of claim 2 wherein said step of generating simultaneous fetch requests includes a step of generating a first tag address for a first data string in said first cache memory and a step of generating a second tag address for a second data string in said second cache memory.

4. The method of claim 3 wherein said step of generating said second tag address includes sequentially advancing said first tag address to the next sequential tag address.

5. The method of claim 4 wherein said step of sequentially advancing said first tag address includes a step of switching said first tag address from said first group of cache lines to said second group of cache lines.

6. The method of claim 1 wherein said step of generating simultaneous fetch requests for sequential cache lines includes fetching said sequential cache lines in the same clock cycle.

7. An electronic data processing system comprising:
   a first cache line for storing a first sequence of instructions, said first cache line being part of an odd set of cache lines stored in a first cache column;
   a second cache line for storing a second sequence of instructions, said second sequence of instructions being next in sequential order after said first sequence of instructions, said second cache line being part of an even set of cache lines stored in a second cache column that is independent of said first cache column, wherein said first and second cache columns are independently responsive to requests for accessing instructions stored therein;
   a processor for requesting instructions for execution, including a selected instruction extending from said first sequence of instructions in said first cache line to said second sequence of instructions in said second cache line;
   fetch means, responsive to receiving requests for instructions from said processor, for initiating simultaneous access to said first sequence of instructions and said second sequence of instructions; and
   switch means for aligning said first sequence of instructions with said second sequence of instructions; and
   switch means for aligning said first sequence of instructions with said second sequence of instructions, said switch means being connected to said first and second cache columns to receive said first and second sequences of instructions in response to said simultaneous accesses initiated by said fetch means.

8. The system of claim 7 further comprising:
   a first content addressable memory (CAM) for storing a first tag address, said first content addressable memory having a direct correspondence to said odd set of cache lines, said first tag address being an indicator for said first sequence of instructions, said first CAM being connected to said first cache column and being cooperative with said fetch means to initiate access of said first sequence of instructions based on said first tag address; and
   a second CAM for storing a second tag address, said second content addressable memory having a direct correspondence to said even set of cache lines, said second tag address being an indicator for said second sequence of instructions and being next in sequential order after said first tag address, said second CAM being connected to said second cache column and being cooperative with said fetch means to initiate access of said second sequence of instructions based on said second tag address.

9. The system of claim 8 wherein said fetch means is enabled to generate said first tag address and said second tag address as a response to receiving a request for instructions from said processor.

10. The system of claim 9 wherein said means for generating said second tag address includes an adder for determining the next sequential tag address that follows said first tag address.

11. The system of claim 7 wherein said fetch means for initiating simultaneous accesses to said first sequence of instructions and said second sequence of instructions accesses said first sequence of instructions and said second sequence of instructions in the same clock cycle.

12. The system of claim 7 wherein each cache line in said odd set of cache lines is designated by a first tag address indicator and wherein each cache line in said even set of cache lines is designated by a second tag address indicator.

13. A method of accessing and distributing stored data in a computer system including the steps of:
   storing a first cache line of data having a first tag address, said first cache line being part of a first access-related group of cache lines stored in a first cache capacity;
   storing a second cache line of data having a second tag address, said second tag address being the next sequential tag address to said first tag address, said second cache line being part of a second access-related group of cache lines in a second cache capacity, wherein operation of said second cache capacity is isolated from operation of said first cache capacity;
   receiving a request for a desired portion of cache data, said desired portion of cache data being partially contained within said first cache line of data and partially contained within said second cache line of data, said request including said first tag address;
   accessing said first cache line of data and said second cache line of data simultaneously, including accessing said second cache line based on said second tag address being said next sequential tag address, regardless of content of said data in said first and second cache lines;

generating said desired portion of cache data by combining relevant segments of said first cache line of data and said second cache line of data; and distributing said desired portion of cache data for further processing in said computer system.

14. The method of claim 13 wherein said step of receiving a request for a desired portion of cache data is a step of receiving said first tag address, said first tag address being associated with a first part of said desired portion of cache data.

15. The method of claim 13 further including a step of generating said second tag address based exclusively on said second tag address being said next sequential tag address to said first tag address.

16. The method of claim 15 wherein said step of generating said second tag address includes sequentially advancing said first tag address regardless of said content of said data in said second cache line.

17. The method of claim 15 wherein said step of generating said second tag address is a step of changing said first tag address from said first group of cache lines to said second group of cache lines.

18. The method of claim 13 wherein said step of accessing said first cache line of data and said second cache line of data simultaneously includes a step of accessing said first cache line of data and said second cache line of data within the same clock cycle of said computer system.

19. The method of claim 13 wherein said step of distributing said desired portion of cache data includes delivering instruction data to a computer processor.

* * * * *